Feb. 3, 1925.
W. MARTINSON
1,524,875
DRIVE FOR FRONT WHEELS OF MOTOR VEHICLES
Filed Feb. 8, 1923 4 Sheets-Sheet 1
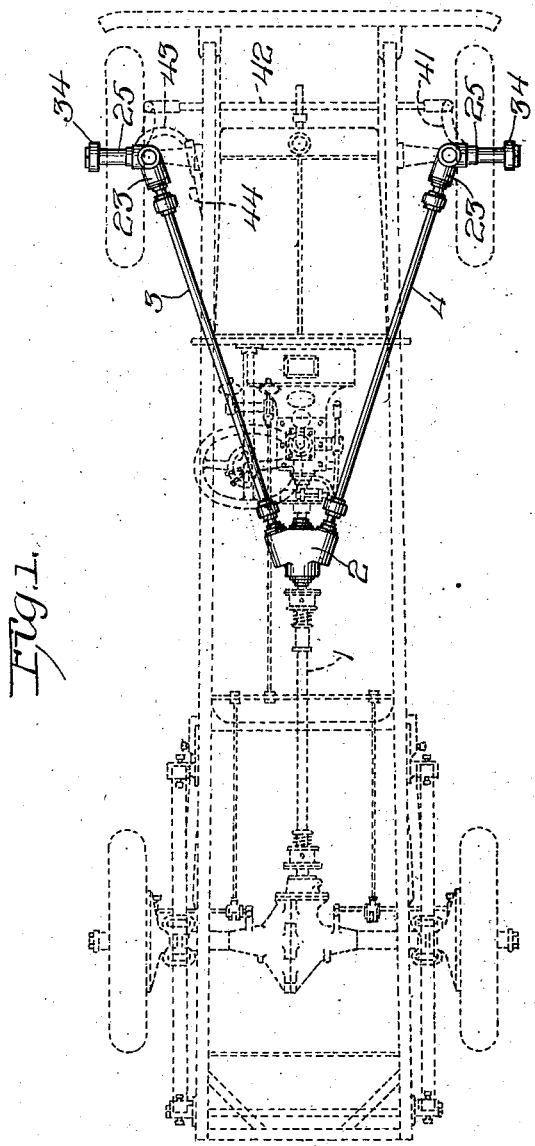
INVENTOR.
William Martinson,
BY Wm. F. Freudenreich,
ATTORNEY.

Feb. 3, 1925.   1,524,875
W. MARTINSON
DRIVE FOR FRONT WHEELS OF MOTOR VEHICLES
Filed Feb. 8, 1923    4 Sheets-Sheet 2
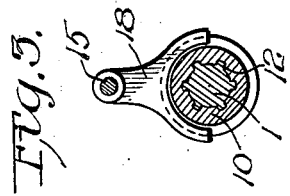
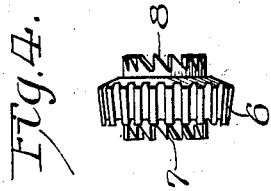
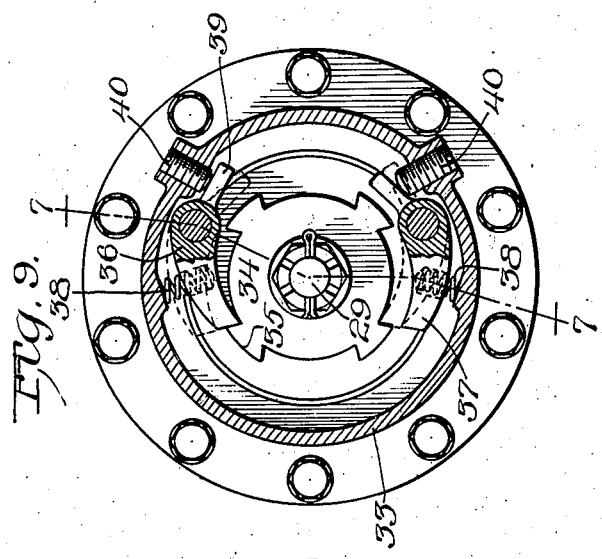
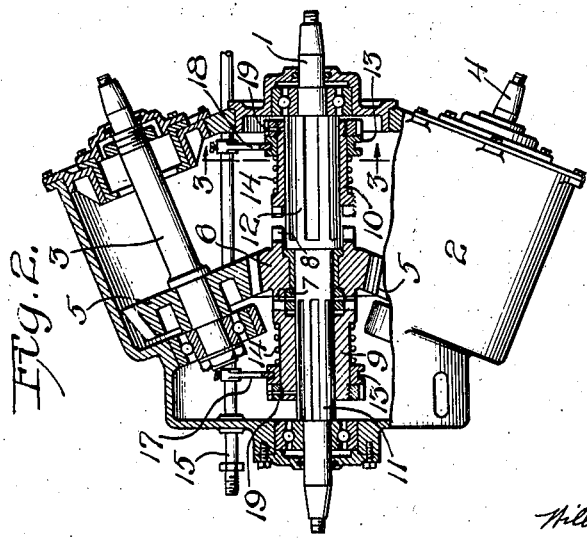
INVENTOR.
William Martinson,
BY Wm. F. Freudenreich,
ATTORNEY.

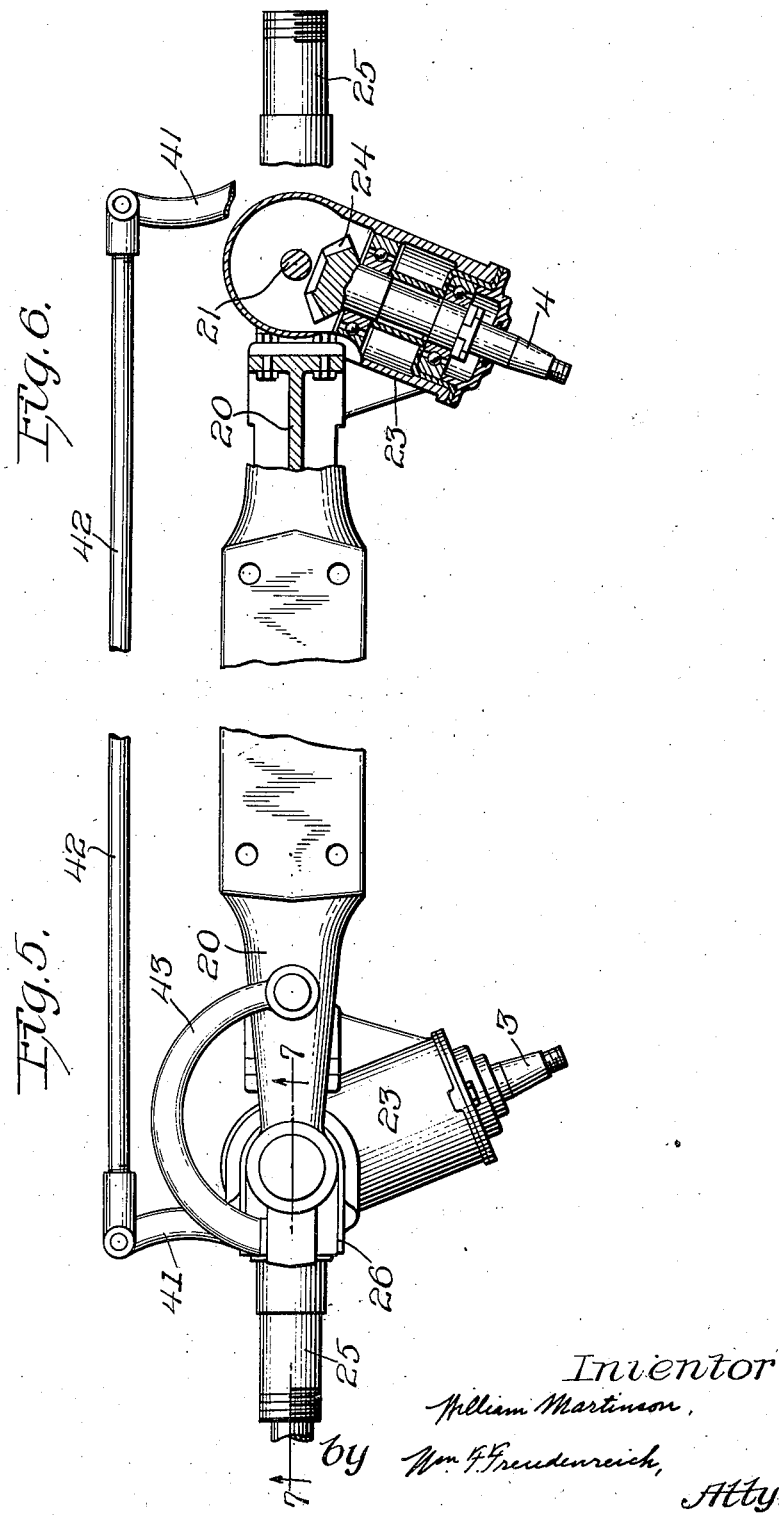

Feb. 3, 1925.
W. MARTINSON
1,524,875
DRIVE FOR FRONT WHEELS OF MOTOR VEHICLES
Filed Feb. 8, 1923    4 Sheets-Sheet 4
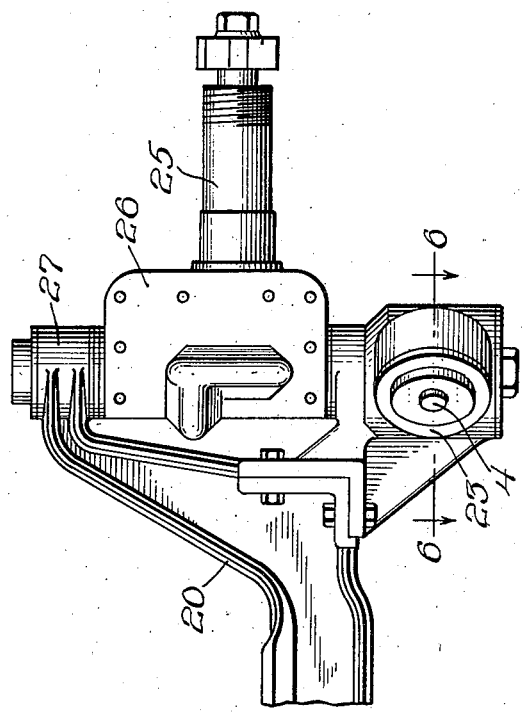
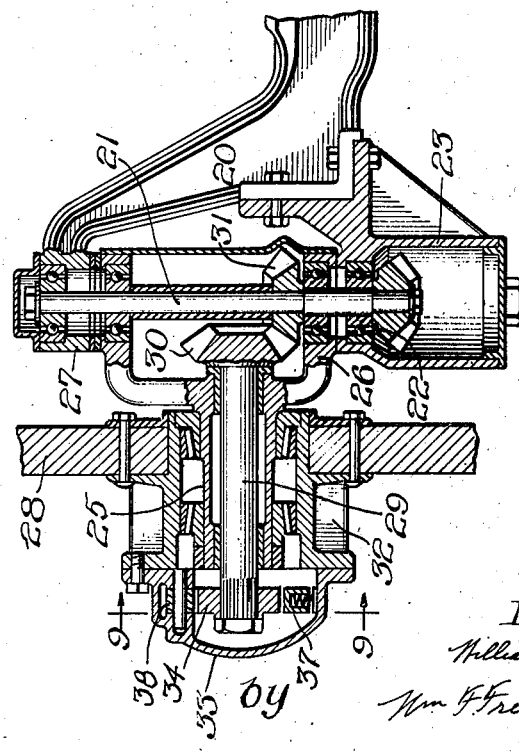
Inventor:
William Martinson,
by Wm F Freudenreich,
Atty.

Patented Feb. 3, 1925.

1,524,875

UNITED STATES PATENT OFFICE.

WILLIAM MARTINSON, OF KENOSHA, WISCONSIN.

DRIVE FOR FRONT WHEELS OF MOTOR VEHICLES.

Application filed February 8, 1923. Serial No. 617,726.

*To all whom it may concern:*

Be it known that I, WILLIAM MARTINSON, a citizen of the United States, residing at Kenosha, county of Kenosha, State of Wisconsin, have invented a certain new and useful Improvement in Drives for Front Wheels of Motor Vehicles; and declare the following to be a full, clear, and exact description of the same, such as will enable others skilled in the art to which it pertains to make and use the same, reference being had to the accompanying drawings, which form a part of this specification.

The common practice in motor-driven vehicles is to drive them through the rear wheels, leaving the front wheels to run idle. Conditions often arise which make it desirable that each wheel be a driving wheel and, on this account so-called four-wheel drives have come into use. Taking motor trucks and other motor-driven vehicles as a whole, only a small fraction of the service performed thereby requires or is benefitted by a four-wheel drive, and therefore the added complication and expense of the mechanism required to drive all four wheels has not been warranted for motor vehicles in general. There are times during the operation of almost any motor vehicle when the ability to drive through all four wheels is very desirable, and the object of the present invention is to produce a means for driving the front wheels of a motor vehicle of a character so simple as to warrant its incorporation in the power plant of a motor vehicle, even though there be only occasional need for driving the front wheels.

A further object of my invention is to produce a simple and novel mechanism whereby the front wheels of a motor vehicle may be driven without the necessity of making any change in the mechanism of an ordinary rear wheel drive; or, viewed in another aspect, my invention may be said to have for its object to produce a simple and novel auxiliary mechanism adapted to be connected to the front wheels of a motor vehicle whose rear wheels are power-driven, so as to permit the front wheels also to be driven.

A still further object of the present invention is to provide a simple and novel mechanism whereby the front wheels of a motor vehicle may be power-driven either in a forward or in a reverse direction or, if desired, be permitted to run idly.

The various features of novelty whereby my invention is characterized will hereinafter be pointed out with particularity in the claims; but for a full understanding of my invention and of its objects and advantages, reference may be had to the following detailed description taken in connection with the accompanying drawings, wherein:

Figure 1 is a plan view of a motor vehicle chassis equipped with driving mechanism arranged in accordance with my invention, all of the parts except the new elements constituting the present invention, being shown in dotted lines;

Fig. 2 is a view partly in plan elevation and partly in horizontal section, on a somewhat larger scale than Fig. 1, through the driving mechanism between the main shaft and the auxiliary shafts;

Fig. 3 is a section taken approximately on line 3—3 of Fig. 2, the casing being omitted;

Fig. 4 is a side elevation of the gear wheel on the main shaft for driving the auxiliary shafts;

Fig. 5 is a top plan view of one end of the front axle with the entire wheel left off;

Fig. 6 is a view similar to Fig. 5, but partly in horizontal section, showing the opposite end of the axle from that shown in Fig. 5, the section being taken approximately on line 6—6 of Fig. 8;

Fig. 7 is a vertical section through one end of the front axle with its wheel, the section being taken approximately on line 7—7 of Fig. 5;

Fig. 8 is a front elevation of the opposite end of the axle from that shown in Fig. 7; the wheel being omitted; and Fig. 9 is a section on an enlarged scale, taken approximately on line 9—9 of Fig. 7.

Generally speaking, the construction which I have illustrated as embodying my invention consists of driving mechanism at each of the front wheels, driving shafts extending diagonally toward the rear from such driving mechanism to the vicinity of the main engine shaft, together with driving mechanism between the three shafts.

Surrounding a portion of the main engine shaft 1 and preferably located behind the main gear box of the usual power plant, is a stationary casing 2, into which extend the rear ends of two diverging shafts 3 and 4, each extending into proximity of one of the front wheels. On the inner end of each of the shafts 3 and 4 is fixed a bevel gear wheel 5 meshing with a pinion 6 on the main shaft. The pinion is loose on the main shaft but is adapted to be clutched thereto by suitable means. In the arrangement shown, see Figs. 2 and 4, the pinion 6 has on opposite ends thereof two sets of clutch teeth 7 and 8 facing in opposite directions, so that the pinion can be driven in one direction only by a clutch element co-operating with one set of teeth, and in the other direction only by a clutch element co-operating with the other set of teeth. In the arrangement shown there are two clutch elements 9 and 10 arranged on the main shaft on opposite sides of the pinion 6, the shaft being provided with longitudinally extending ribs or splines 11 and 12 interlocked with the members 9 and 10 so as to permit these members to slide lengthwise of the shaft but compel them to rotate with the shaft. On each movable clutch element is loosely arranged a grooved clutch collar 13 between which and a shoulder at the toothed end of the clutch element is arranged a spring 14. A clutch-shifting rod 15 is slidably mounted in bearings in the casing parallel with the main shaft, and on this rod are two forks 17 and 18 co-operating with the two grooved rings. Normally the spring on each clutch element holds the grooved ring against an annular shoulder or collar 19 fixed to the corresponding clutch element. When the clutch rod is shifted in one direction it moves one of the clutch elements away from the pinion and the other clutch element towards the pinion. The springs, just described, permit these movements of the clutch rod to be made without waiting for the clutch element which is being moved into clutching relation to come into registration with the teeth on the pinion, since the springs will yield and permit the clutch rod to move independently of the clutch sleeves; the spring surrounding that sleeve which is not moved as fast as the clutch rod being simply placed under tension so that it can act quickly to throw in the clutch when the teeth come into the proper positions relative to each other.

The parts are preferably so arranged that in one position of the clutch rod both clutches will be open, so that the main shaft may revolve without affecting the auxiliary shafts.

The reason for having two clutches is to permit one to be used for forward and the other for reverse and prevent any possibility of locking the pinion to the main shaft, as would be the case if the teeth of one clutch were so shaped as to permit them to drive in both directions. With the arrangement shown, in the event that the clutches are not shifted to correspond with the main controlling levers for the vehicle, the teeth of that clutch sleeve which are in mesh when they should not be, will simply ride over the teeth of the pinion.

The mechanism at the front wheels is best shown in Figs. 5 to 9, inclusive. Supported at each end of the front axle 20 is a rotatable vertical shaft 21, on the lower end of which is a bevel gear wheel 22 arranged in a suitable housing 23 fixed to the axle. The front end of the corresponding auxiliary shaft extends into and is supported by this housing and is provided with a bevel gear wheel 24 which meshes with the wheel 22. Consequently when the shafts 3 and 4 are rotated they will cause the two vertical shafts 21, at the ends of the axle, to rotate likewise. The journals for supporting the front wheels are in the form of horizontal tubes or sleeves 25 projecting from housings 26, each surrounding and being revoluble upon the vertical shaft 21; each housing extending between the casing 23 which lies below the same and an over-hanging portion 27 of the axle. On each of the journals is rotatably supported a suitable wheel 28.

Rotatably mounted in each of the journals, and extending completely through the same, is a shaft 29, on the inner end of which is a bevel wheel 30 meshing with a complementary wheel 31 fixed to the corresponding vertical shaft 21. Therefore, when the auxiliary driving shafts are rotated, operating through the vertical shafts 21, they drive the shafts 29 that extend through the journals supporting the front wheels. Each wheel hub 32 has on its outer end a hub cap 33 which is made dome-like so as to provide a chamber into which the outer end of the shaft 29 projects. Fixed to the outer end of each of the shafts 29, within the chamber in the hub cap, is a disc 34 having peripheral teeth 35, as best shown in Fig. 9. Pivotally supported in each hub cap are two pawls 36 and 37, oppositely directed and each adapted to co-operate with the teeth on the adjacent disc. The pawls may be yieldingly pressed toward the peripheries of the discs by means of springs 38 behind them. It will be seen that if both pawls in each hub are in driving relation to the corresponding toothed disc, they will serve to lock that hub to the driving shaft to which that disc is fixed; so that the relation of the two front wheels to each other would be the same as though they were both fixed to the ends of a rotatable axle, neither being permitted to rotate more rapidly than the other.

It is desirable, however, to permit the outer wheel of a motor vehicle going around a curve, to over-ride and run faster than the inner wheel. Therefore the connection between each wheel and its driving shaft should be such as to permit either wheel to run faster than the other. I am able to accomplish this in a simple way, for the reason that it is not often that it will be necessary to drive the front wheels while running backwards, and therefore that pawl in each hub which serves to drive the wheel backward may normally hold out of operative relation to the toothed disc; thus permitting both wheels to run idly when the vehicle is moving backwards and permitting either wheel to run ahead faster than the other when occasion demands. In the arrangement shown, each pawl is provided with a tail 39 adapted to be engaged by a screw 40 passing through the cylindrical wall of the hub cap. That screw associated with the pawl 37 is shown as occupying such a position that the pawl is lifted clear of the teeth on the co-operating disc; so that if the pawl 37 be assumed to be the one designed to drive the wheel in a backward direction, power will be applied to the wheel only when it is running in a forward direction and only when it is not required to travel faster than the wheel on the opposite side of the vehicle. If at any time it should be found necessary to drive the front wheels in the backward direction, the screws holding the reversing pawls out of play could quickly be adjusted with a screw driver or other tool so as to permit these pawls to come into action, the other pawl in each wheel being in the meantime locked out of action, if desired.

Each of the swinging wheel supports, 26, is provided with a forwardly-projecting arm 41, as best shown in Figs. 1, 5 and 6, and the free ends of these arms are connected together by a cross rod 42; and one of said supports is provided with an arm 43 to which is attached the steering rod 44. These elements may be precisely the same as those employed in any rear-wheel-driven vehicle for steering purposes. It will thus be seen that the front wheels are controlled, for steering, in just the same way as though there were no driving mechanism therefor; the only difference being that the knuckle pins serve also as driving shafts which are operatively connected to the adjacent wheels by mechanism extending through the hubs of the latter.

It will also be seen that I have provided a simple construction and arrangement which permits the front wheels of a motor vehicle to run idle or be power driven, as the driver may choose, without interfering with the capacity of the wheels to rotate at different speeds relatively to each other. It will further be seen that although the mechanism can drive the front wheels in only one direction while they retain their capacity to overrun, yet only a simple adjustment need be made to shift from capacity to drive forward to capacity to drive backward, so that in an emergency the most desirable condition to meet the particular situation at hand may be secured.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. In combination, an axle having at one end two elements fixed thereto and lying one above the other and spaced apart from each other, a member fitting between said elements, a pintle extending through said elements and said member and permitting said member to swing about the axis of the pintle, a tubular journal projecting laterally from said member, a wheel on said journal, a shaft extending through said journal, a differential drive mechanism between the outer end of the shaft and the said wheel, gearing between the inner end of said shaft and said pintle, and means for rotating said pintle.

2. In combination, an axle having at one end two elements fixed thereto and lying one above the other and spaced apart from each other, a member fitting between said elements, a pintle extending through said elements and said member and permitting said member to swing about the axis of the pintle, a tubular journal projecting laterally from said member, a wheel on said journal, a shaft extending through said journal, a differential drive mechanism between the outer end of the shaft and the said wheel, a bevel gear wheel fixed to the inner end of said shaft, a co-operating bevel gear wheel fixed to said pintle, and means for driving said pintle.

3. In combination, an axle having at one end two elements fixed thereto and lying one above the other and spaced apart from each other, a member fitting between said elements, a pintle extending through said elements and said member and permitting said member to swing about the axis of the pintle, a tubular journal projecting laterally from said member, a wheel on said journal, a shaft extending through said journal, a differential drive mechanism between the outer end of the shaft and the said wheel, co-operating bevel gears fixed respectively to the inner end of said shaft and to said spindle, a bevel gear wheel on the lower end of said pintle below the lower of said two elements, and a driving shaft having a bevel gear wheel co-operating with the last-mentioned gear wheel.

4. In combination, an axle having at one end two elements fixed thereto and lying one above the other and in spaced relation to each other, a housing fitting between said elements, a pintle extending through said elements and through said housing, a tubular journal projecting laterally from said housing, a wheel on said journal, a shaft extending through said journal, a differential driving mechanism between the outer end of the said shaft and the wheel, co-operating gear wheels arranged in said housing and fixed respectively to said pintle and to said shaft, and means for rotating said pintle.

5. In combination, an axle having at one end two elements fixed thereto and lying one above the other and in spaced relation to each other, a housing fitting between said elements, a pintle extending through said elements and through said housing, a tubular journal projecting laterally from said housing, a wheel on said journal, a shaft extending through said journal, a differential driving mechanism between the outer end of the said shaft and the wheel, co-operating gear wheels arranged in said housing and fixed respectively to said pintle and to said shaft, the lower of the aforesaid elements having therein a chamber surrounding the pintle, a driving shaft extending into said chamber, and gear wheels arranged in said chamber and fixed respectively to said pintle and to said driving shaft.

6. In combination, an axle having at one end two elements fixed thereto and lying one above the other and in spaced relation to each other, a housing fitting between said elements, a pintle extending through said elements and through said housing, a tubular journal projecting laterally from said housing, a wheel on said journal, a shaft extending through said journal, a differential driving mechanism between the outer end of the said shaft and the wheel, co-operating gear wheels arranged in said housing and fixed respectively to said pintle and to said shaft, the lower of the aforesaid elements having therein a chamber surrounding the pintle, a driving shaft rotatably supported at one end by said lower element and extending into the chamber therein, and co-operating bevel gears arranged in said chamber and fixed respectively to said pintle and to said driving shaft.

7. The combination with a hollow journal, of a wheel hub revolubly supported on said journal, a cap on one end of the hub beyond said journal, a driving shaft extending through said journal, an element fixed to said shaft within said hub cap and having peripheral teeth or projections, two oppositely-directed pawls carried by said cap for co-operation with said teeth or projections, and manually controlled means for locking one of said pawls out of operative relation to said element.

8. The combination with a hollow journal, of a wheel hub revolubly supported on said journal, a cap on one end of the hub beyond said journal, a driving shaft extending through said journal, an element fixed to said shaft within said hub cap and having peripheral teeth or projections, two oppositely-directed pawls carried by said cap for co-operation with said teeth or projections, and a screw passing through said hub cap in position to engage one of said pawls and lock it out of operative relation to said element.

9. The combination with the central longitudinal main drive shaft for the rear wheels of a four-wheeled vehicle, of auxiliary shafts extending rearwardly and inwardly from the front wheels of the vehicle into proximity to the main shaft, a gear wheel loose on the main shaft, gear wheels fixed to said auxiliary shaft and meshing with the other gear wheel, clutch mechanism for locking the gear wheel on the main shaft to the latter, and driving connections between said auxiliary shafts and said front wheels.

10. The combination with the central longitudinal main drive shaft for the rear wheels of a four-wheeled vehicle, of auxiliary shafts extending rearwardly and inwardly from the front wheels of the vehicle into proximity to the main shaft, a gear wheel loose on the main shaft, gear wheels fixed to said auxiliary shafts and meshing with the other gear wheel, the gear wheel on the main shaft having oppositely-directed clutch teeth each adapted to drive in one direction only at opposite ends thereof, two clutch-sleeves splined to the main shaft on opposite sides of the gear wheel on the latter and having teeth complementary to the clutch teeth on the gear wheel, and driving connections between said auxiliary shafts and said front wheels.

11. The combination with the central longitudinal main drive shaft for the rear wheels of a four-wheeled vehicle, of auxiliary shafts extending rearwardly and inwardly from the front wheels of the vehicle into proximity to a continuous portion of the main shaft, a gear wheel loose on the said portion of the main shaft, gear wheels fixed to said auxiliary shafts and meshing with the other gear wheel, clutch mechanism for locking the gear wheel on the main shaft to the latter, and differential driving connections between said auxiliary shafts and said front wheels.

12. In a mechanism of the character described, a casing, a continuous main shaft extending through said casing, diverging auxiliary shafts extending into said casing, a gear wheel loose on the main shaft, gear wheels fixed to the auxiliary shafts and meshing with the aforesaid gear wheel, and a clutch between the main shaft and its gear wheel.

13. In a mechanism of the character described, a casing, a continuous main shaft extending through said casing, diverging auxiliary shafts extending into said casing, a gear wheel loose on the main shaft, gear wheels fixed to the auxiliary shafts and meshing with the aforesaid gear wheel, and two clutches arranged between said main shaft and the gear thereon, one clutch being constructed to drive in one direction and the other clutch being constructed to drive in the opposite direction, and both clutches being constructed and arranged to permit overrunning when the auxiliary shafts tend to run faster than the rate at which they are being driven from the main shaft.

14. In a four-wheeled motor vehicle, a drive shaft for the rear wheels, auxiliary shafts extending between the aforesaid shaft and the front wheels of the vehicle, driving mechanism, including a clutch, between the rear ends of the auxiliary shafts and the drive shaft for the rear wheels, a toothed element adjacent to each front wheel, driving means between each auxiliary shaft and one of said toothed elements, two oppositely-directed pawls carried by each front wheel and each adapted to engage the corresponding toothed element, and a manually-controlled device at each front wheel for locking one of said pawls out of engagement with the corresponding toothed element.

15. The combination with a hollow journal, of a wheel hub rotatably supported on said journal, a rotatable shaft extending through said journal, an element fixed to one end of said shaft and having peripheral teeth or projections, two oppositely-arranged pawls carried by said hub in position to cooperate with the teeth on said element, one of said pawls being adapted to drive the wheel hub in one direction and the other pawl being adapted to drive the hub in the opposite direction, and manually-controlled means carried by said hub for locking either or both of said pawls in inoperative positions.

In testimony whereof I sign this specification.

WILLIAM MARTINSON.